(12) United States Patent
Antonsen

(10) Patent No.: US 9,444,387 B2
(45) Date of Patent: Sep. 13, 2016

(54) METHOD AND DEVICE FOR CONTROLLING INDUCTIVE LOADS

(75) Inventor: Dag Antonsen, Gjesaasen (NO)

(73) Assignee: A-T HOLDING DA, Sander (NO)

( * ) Notice: Subject to any disclaimer, the term of this patent is extended or adjusted under 35 U.S.C. 154(b) by 203 days.

(21) Appl. No.: 13/382,914

(22) PCT Filed: Jun. 23, 2010

(86) PCT No.: PCT/NO2010/000240
§ 371 (c)(1),
(2), (4) Date: Jan. 31, 2012

(87) PCT Pub. No.: WO2011/005103
PCT Pub. Date: Jan. 13, 2011

(65) Prior Publication Data
US 2012/0126739 A1    May 24, 2012

(30) Foreign Application Priority Data

Jul. 7, 2009  (NO) .................................. 20092580
Dec. 3, 2009  (NO) .................................. 20093466

(51) Int. Cl.
*H02P 3/00*    (2006.01)
*H02P 27/06*   (2006.01)
*H02M 3/07*    (2006.01)
*H02M 3/155*   (2006.01)

(52) U.S. Cl.
CPC .............. *H02P 27/06* (2013.01); *H02M 3/07* (2013.01); *H02M 2003/1555* (2013.01)

(58) Field of Classification Search
CPC .. H02P 6/18; H02P 21/0089; H02P 2207/03; A63H 29/22; B60K 6/22; B60K 1/02; B60K 6/26; B60K 6/48; B60L 3/003; B60L 11/1803

USPC .................................................. 318/494, 500
See application file for complete search history.

(56) References Cited

U.S. PATENT DOCUMENTS

| | | | | |
|---|---|---|---|---|
| 3,579,111 A | * | 5/1971 | Johannessen ............ | H03K 3/80 327/181 |
| 3,997,832 A | * | 12/1976 | Tanaka ................... | H01F 7/1816 307/110 |
| 2008/0106155 A1 | * | 5/2008 | Yamada ................... | B60L 13/03 310/12.19 |

(Continued)

FOREIGN PATENT DOCUMENTS

| | | |
|---|---|---|
| JP | 59002591 | 1/1984 |
| JP | 3265493 | 11/1991 |

*Primary Examiner* — Kawing Chan
*Assistant Examiner* — Zoheb Imtiaz
(74) *Attorney, Agent, or Firm* — Ladas & Parry LLP

(57) ABSTRACT

Control circuitry for inductive loads comprehending a DC power source (DC), electrical switches (A and R) and appropriate electrical conductors to direct current to an inductive load, as the control system includes a primary circuit and a secondary circuit which is partly concurrent with the primary electrical circuit. The primary electrical circuit includes a series of DC power sources (DC), an inductive load in the form of an electric motor (M) or transformer (T) and a capacitor (C), while the secondary electrical circuit includes the inductive loads and capacitor (C), since the two electrical switches (A and R) are so arranged that the power of a first operational phase is driven through the primary electric circuit by the voltage supplied by the DC power source (DC) while the current in another phase of operation runs through the secondary electric circuit by the voltage supplied by the capacitor (C).

6 Claims, 3 Drawing Sheets

(56) References Cited

U.S. PATENT DOCUMENTS

| | | | |
|---|---|---|---|
| 2009/0072917 A1* | 3/2009 | Yajima | H03B 5/326 331/108 R |
| 2010/0055642 A1* | 3/2010 | Rothenwaender | A61C 1/05 433/99 |
| 2011/0121774 A1* | 5/2011 | Shimada | H02M 1/4233 318/729 |
| 2011/0176281 A1* | 7/2011 | Ikemoto | B60L 3/0046 361/729 |
| 2013/0234553 A1* | 9/2013 | Kusase | H02K 16/02 310/114 |

* cited by examiner

METHOD AND DEVICE FOR CONTROLLING INDUCTIVE LOADS

This application is a 371 of PCT/NO2010/000240 filed on Jun. 23, 2010, which claims priority to Norwegian Patent Application No. 20092580, filed Jul. 7, 2009, and Norwegian Patent Application No. 20093466, filed Dec. 3, 2009, all of which are incorporated herein by reference.

The present invention concerns a control circuitry for inductive loads as stated in the preamble of the claim 1 According to a further aspect the invention concerns a method for controlling the electric motor/inductive loads as stated in preamble of the claim 10.

Energy savings and measures to reduce stress on the environment through energy have had a strong focus in recent years and are expected to be even stronger as the countries and regions, that have been previously referred to as developing countries, are becoming industrialized nations with far greater need for energy than before. Any measures to reduce energy consumption and save the environment will be valuable in the world today.

As for electrical energy, the consumption of this is distributed on a variety of equipment and appliances in the industry as well as in private and public housing. Some goes to heating, some to lighting and some to electric appliances such as refrigerators, air conditioning, washing machines, compressors, blowers, electric saws, grinders, drilling machines and many other electric utilities. Not least a good deal of power is used for transportation, such as trams, electric buses and the like, and eventually also for electrically powered private cars. It is obvious that in addition to obtaining the electrical energy in the most environmentally friendly way, it would be of great value to be able to reduce consumption of energy in the individual electrical appliance per amount of work performed.

As for control of DC motors the dominant system today is the so-called PWM (Pulse-width modulation) control system, which from a signal or power source means to modulate cycles. This is either to transfer information in a communication or to control the effect of a load which might be an oven or an electric motor.

When it comes to principles or systems for control of three phase motors, the ESC (Electronic Speed Control) is an electronic circuit with the purpose to vary an electric motor speed, direction, and as a dynamic brake.

A transformer (in the technical field often abbreviated as CT) is a device that transfers energy from one circuit to another by means of electromagnetic induction. Energy can be transmitted in alternating current fields, transformers must thus be operated with AC power.

Despite the fact that the technologies described above are dominant today, it does not mean that there is no room or need for improvement, so you can get more actual work done per used amount of electrical energy.

OBJECT

It is a primary object of the present invention to provide a control circuitry, or a principle of control circuitry for inductive loads such as motors and transformers, which provide greater energy utilization than hitherto known systems.

It is a further object of the present invention to achieve the primary purpose with means that are easy and cheap to implement, so that the equipment to be used does not become more expensive or complicated.

THE INVENTION IN GENERAL

The above objectives are achieved by the present invention which, according to a first aspect consists of a control circuitry as defined in claim 1.

According to another aspect the invention concerns a method as specified in claim 10.

Preferred embodiments of the invention are evident from the independent claims.

It is the main point of the present invention to save energy, and the present invention demonstrates that it can save significant energy by such a simple remedy that alternately supplies power to, and drains power from a capacitor, that is placed in a power supply to the relevant electricity consumers in the form of inductive loads. This is not consistent with accepted theory in the field and the invention thus represents a major surprise and must be said to break with existing prejudices in this area.

The invention is based on the condenser phenomenon of being a non-energy-consuming component. In all use today capacitors are used for their energy capacity.

Capacitors are used to stabilize power supply, ensure that the energy consuming devices always have enough energy to use. A capacitor is built to store energy until the energy is desired. The charging of a capacitor consumes no energy. Energy is just moved. By using this feature you can do active work from a reactive energy when you fill a capacitor. This is achieved by charging the capacitor via an energy-consuming device which will perform a piece of work. Then you can utilize the energy stored in the capacitor to active work that corresponds to the work performed by the charge.

The DC power source that is described may be one or more battery or device for rectifying alternating current. The electrical switches can be physical or electronic switches of any kind. Also as physical switches will typically be ones that are designed to be turned on or off (closed or open) by using electrical impulses.

The term ESC stands for electronic speed control and the term BLDC stands for brushless DC motor.

THE INVENTION IN MORE DETAIL

In the following the invention is described with reference to the attached figures.

The term M is in the following applied to electric motors in general, while the MB is used for bipolar motors, MM is used for mono-polar motors and MT is used for three-phase motors.

Figure 1:
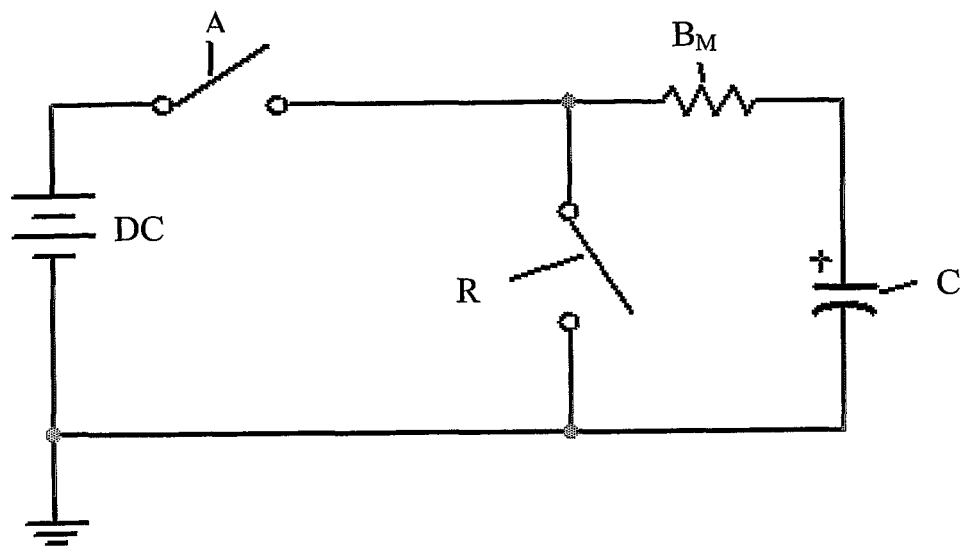
FIG. 1 shows a first embodiment of the invention where the inductive load is a bipolar motor.

FIG. 1 shows a primary circuit that includes a DC power source DC, a first electrical switch A (active switch), an inductive load in the form of a bipolar motor MB, a capacitor C and electrical conductors connecting these elements.

When the switch A is closed (connected), current will flow clockwise in the circuit until eventually the capacitor C is fully charged. There is also a secondary circuit that includes the same bipolar motor and the same capacitor, an electrical switch R (reactivation switch) and electrical conductors connecting the aforementioned elements. When the switch R is closed, and with switch A open (disconnected) current will flow counter clockwise in the secondary circuit until R is again opened, or if there is no power left on the capacitor C. A person skilled in the art will understand that the switch A and R must not be closed at the same time, then it will short out the DC power source. Opening and closing of the electrical switches A and R's will be at a rate determined by the actual motor used in line with the motor's change of polarity. The MB motor will receive an alternating current, as it is intended, with the change of current direction every time the motor changes the polarity. It should be emphasized that the active switch A and the reactive switch R may be identical, the labels are selected so because A is closed in the so-called active phase (when the DC power source drives the flow) while R is closed in the reactive phase (when the capacitor drives the flow). It should further be noted that the terms "clockwise" and "counter clockwise" used above and below, are only in relation to the shown figures and do not represent a fundamental feature of the invention.

Figure 2:
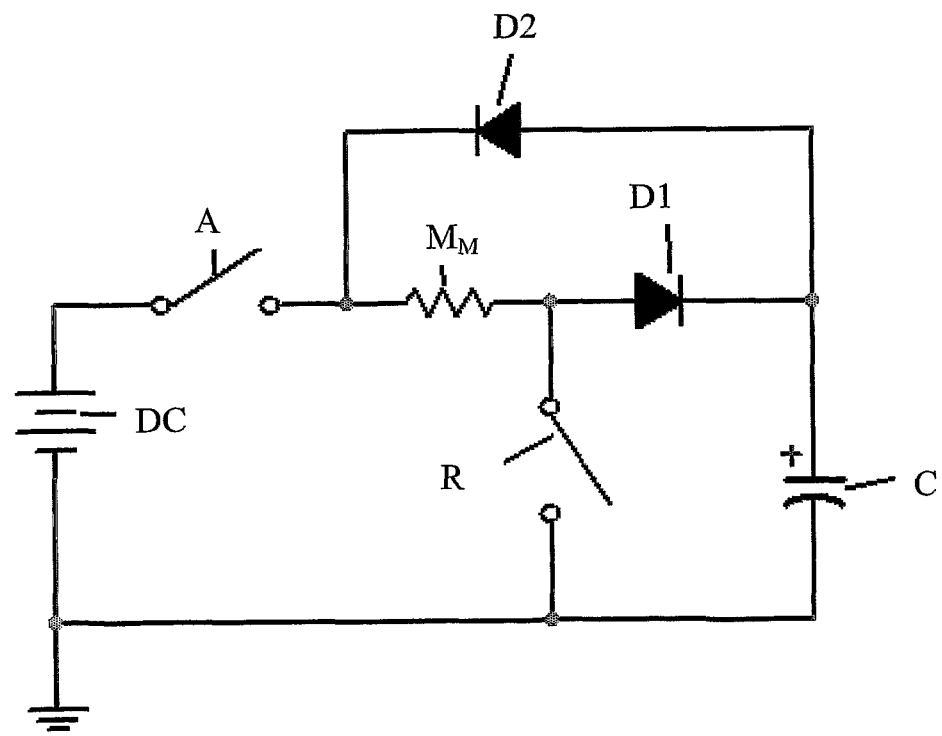
FIG. 2 shows a second embodiment of the invention where the inductive load is a mono-polar motor.

We will now refer to FIG. 2. The figure shows the same general components as shown in FIG. 1. In addition it shows a diode connected in parallel with the mono-polar motor MM, so that electricity can only pass in the parallel component when the voltage is higher on the right side of the motor than on the left side, i.e. in the period in which the reactive switch R is closed and the active switch A is not. There is also a diode in series with the motor MM to prevent the "bypass" past the motor in the reactive phase. Also in this case there may be sensors arranged in connection with the MM motor that opens and closes switches A and R, thereby connecting back and forth between active stage (clockwise current in the primary circuit) and reactive phase (counter clockwise flow in the secondary circuit). For a person skilled in the art it is easy to see that the current in this case will flow in the same direction through the motor MM in the active and reactive phase, i.e. the MM motor receives a pulsed DC power with a frequency given by the motor speed.

Figure 3:
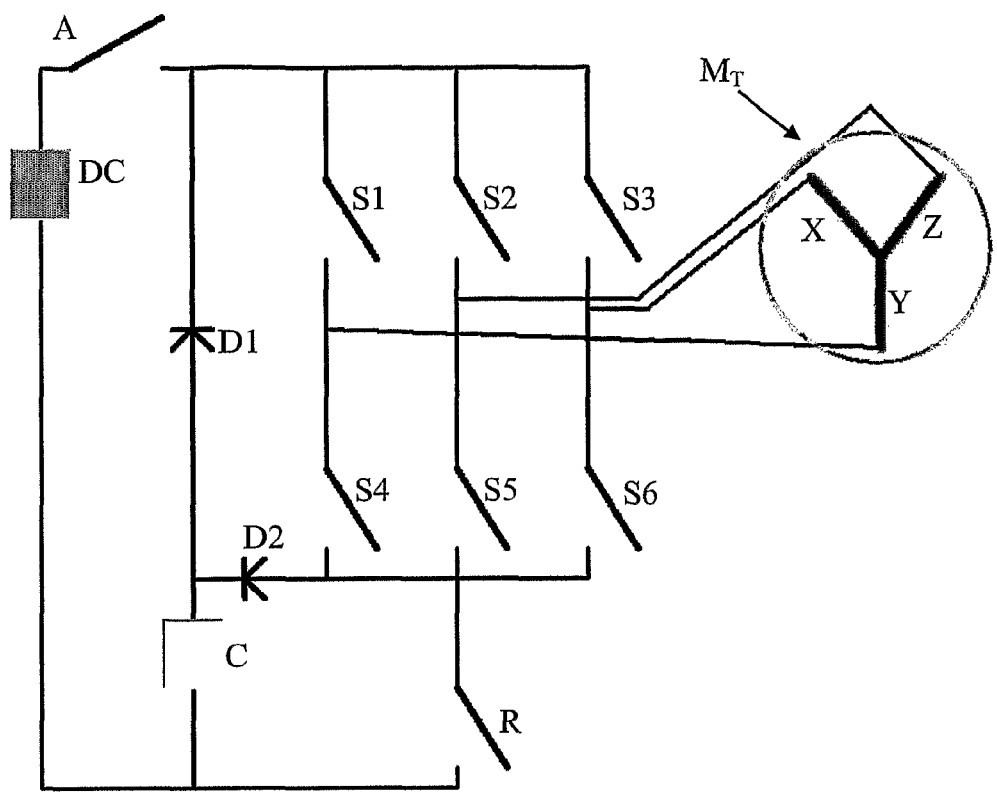
FIG. 3 shows a third embodiment of the invention where the inductive load is a three-phase motor.

We will now refer to FIG. 3. The principle of the present invention for use in connection with the three-phase motors, is exactly the same as those already outlined the construction forms, but due to the motor's complexity, there will be a total of six phases that control passes instead of two, before the whole process starts again from the beginning. This means that the invention must be embodied with three primary and three secondary circuits that are switched on in turn.

In the first, third and fifth phase of operation active switch A is closed while reactive R switch is open. In the second, fourth and sixth operation phase reactive R switch is closed while the active switch A is open. This is entirely analogue to the situation in FIGS. 1 and 2 There are in addition six additional switches to control three phase, numbered S1 to S6, which is closed, respectively open, in the sequence as described below.

In the first phase, switch S1 and S5 closed and the other four are open. This is an active phase where the DC power source drives the motor's winding phases Y and Z and capacitor power supplies. In the second phase, switch S1 and S6 are closed and the other four are open. This is a reactive phase capacitor run motor winding phases Y and X. In the third phase, switch S2 and S6 are closed and the other four are open. This is again an active phase where the DC power source drives the motor winding phases Z and X, and capacitor power supplies. In the fourth phase, switch S2 and S4 are closed and the other four are open. This is again a reactive phase where the capacitor drives the motor's winding phases Z and Y. In the fifth phase, the switch S3 and S4 are closed and the other four are open. This is once again an active phase where the DC power source drives the motor winding phases X and Y, and capacitor power supplies. Finally, in the sixth phase, the switch S3 and S5 are closed the other four are open. This is once again a reactive phase where the capacitor drives the motor's winding phases X and Z.

When the six operational phases above have been completed, a complete "cycle" for the three-phase motor has been carried out and it all starts over again with the first phase of operation, etc.

When the invention is carried out in connection with an electric motor, either single phase or three phase, it is preferred that the voltage of the capacitor is in the range 30-70% of the voltage of the DC power source.

In order to sense rotor position in three-phase motors, there are three options: Hall-effect transistors, opt sensors and EMF (electromagnetic fields).

Figure 4:
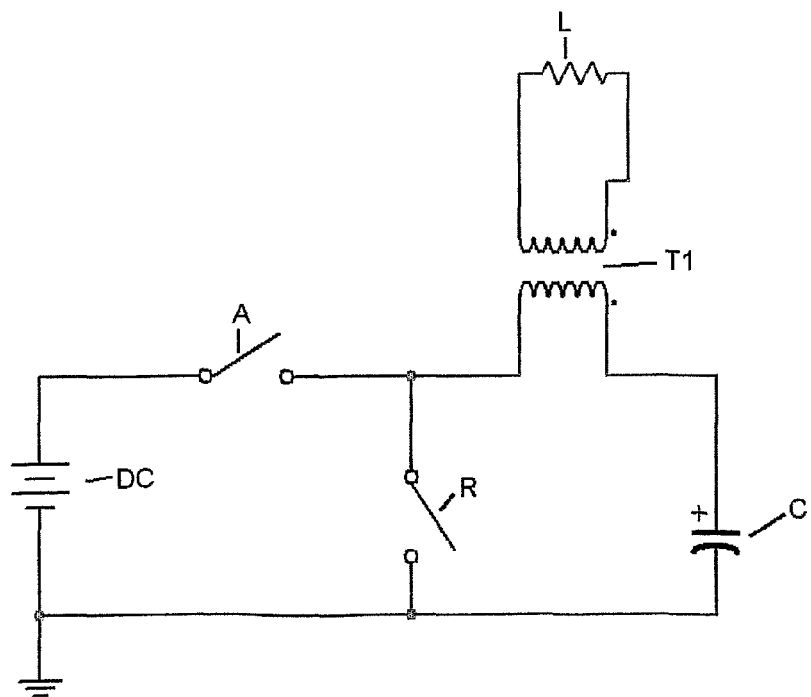
FIG. 4 shows a fourth embodiment of the invention where the inductive load is a transformer.

FIG. 4 shows a primary circuit that includes a DC power source, a first electrical switch A (active switch), an inductive load in the form of transformer T1, a capacitor C and electrical conductors connecting these elements. When the switch A is closed (connected), current will flow clockwise in the circuit until eventually the capacitor C is fully charged. There is also a secondary circuit that includes the same transformer and the same capacitor, an electrical switch R (reactivation switch) and electrical conductors connecting the aforementioned elements. When the switch R is closed, and with switch A open (disconnected) it will flow counter clockwise current in the secondary circuit until R is again opened, or if there is no power left on the capacitor C. A professional will understand that the switch A and R must not be closed simultaneously, then it will short out the DC power source. Opening and closing of the electrical switches A and R's are done at a rate which is determined by a signal generator, typically 50 Hz. The transformer T1 will therefore find that it receives an alternating current, as is intended, with the change of current direction every time the signal generator changes the polarity. The load L will therefore experience that an AC identical to the set frequency. The described invention is realized best in relation to a transformer when the voltage of the capacitor is of the order of 50% of the voltage of the DC power source.

Figure 5:
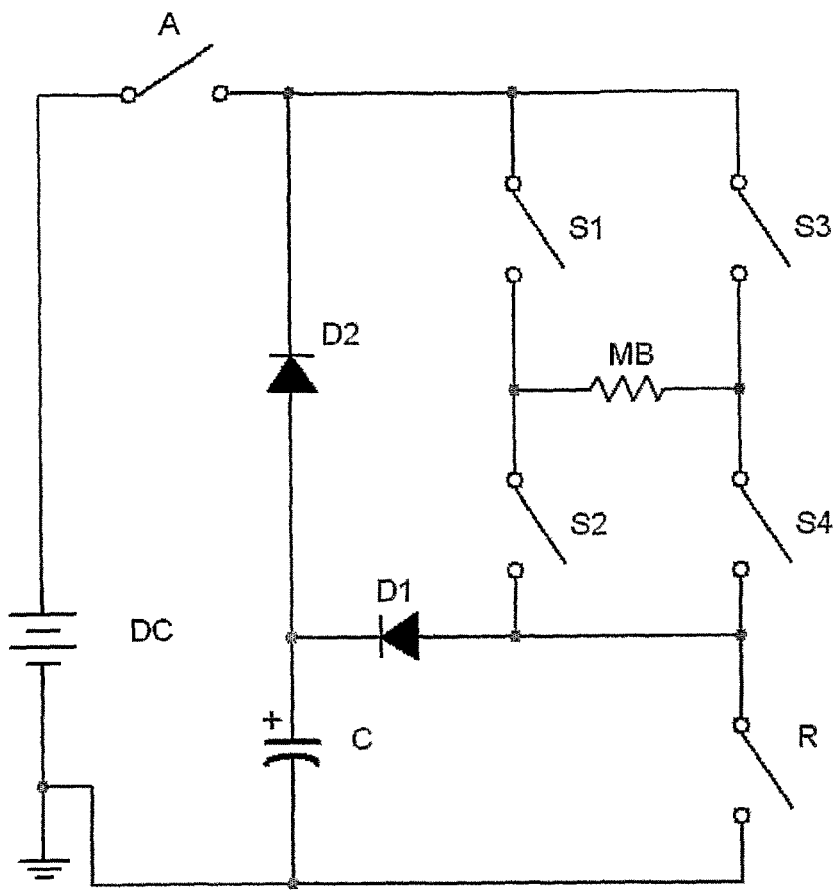
FIG. 5 shows yet another embodiment of the present invention.

FIG. 5 shows another alternative design form of the present invention, where the inductive load has the form of a motor connected in a so-called H-bridge of four switches, S1-S4, which allows it to run in any direction. The motor may be a bipolar or a monopolar motor.

Figure 6:
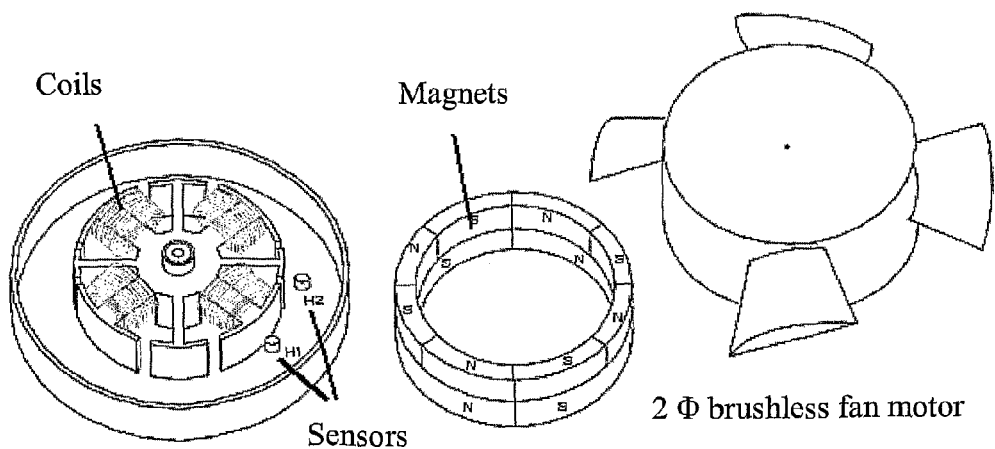
FIG. 6 shows a schematic of a bipolar motor according to the design form shown in FIG. 1

FIG. 6 shows a simplified single phase, brushless, bipolar motor with coils, magnets and sensors (H1 and H2). This type of motor, depending on winding method, may be both monopolar and bipolar. Sensors H1 and H2 are in the same angular extent as the permanent magnet's change of polarity in the rotor. If the polarity of the magnets changes each 90 degrees, the angle of H1 will be equivalent. If the motor is monopolar, there will be a marked distinction between the magnets.

It is the magnets on the rotor, be they outrunners or inrunners of BLDC motors, that determine what kind of winding it should be, and whether there is a monopolar or bipolar motor. FIG. 5 shows a so-called outrunner, where the magnets are on the rotor outside the windings. The so-called inrunners have magnets on the rotor shaft and the windings are around the rotor.

While the above invention is generally discussed in terms of what occurs in the course of one operating cycle of an electric motor, it is clear that in professional practice, the advantages of the invention will be pronounced in the running of a significant number of operating cycles. That is to say what has been described in relation to, for example the first, third and fifth phase of operation is repeated for every odd numbered phase of operations. Accordingly the pronounced advantages of the invention described in relation to the second, fourth or sixth phase of operation will be repeated for every even-numbered phase of operations.

In general, it should be noted that the system according to the present invention can also include other components than those shown and described as only the general and fundamental features of the invention are devoted attention here. Thus for example, the use of additional capacitors in the conventional way, in order to stabilize power supply, may be included without violating the principles of the present invention.

While the primary benefit of the present invention is that it is energy saving, there is also a latent property of the control circuit that if the motor of any reason should stop, it is impossible for the circuit to continue consuming power. Summarized and Generalized the Invention Comprises:
  Circuit that fills a capacitor with energy using a load carrying out the work.
  Circuit that fills a capacitor using a load that performs work when the power is controlled by diodes and goes through the load and fills the condenser, and discharges through the load in the same direction.
  Circuit that fills a capacitor through a load carrying out the work, as the current passes through the load and fills the condenser, after which the flow goes the same route back through the load and empties the capacitor.
  Circuit which, by use of a capacitor's properties makes it possible to utilize both the active and reactive energy to perform work.

EXAMPLES

The following describes some simple examples that describe the savings potential for controlling according to the presented invention compared to a conventional PWM control that is now regarded as standard management of single phase (brushless) motors.

The motor in the example is a brushless motor from Torin-Sifan, type DSG75-40 that is publicly available in the market today. In series 1 the same motor was operated with controls according to the discussed invention and the conventional controller with a fan without the fan housing attached. The power supply was increased until it reached a constant speed of 3600 rpm that represents a given, constant amount of work done by the fan. The effect that was added to the conventional control system was by definition set to 100%.

TABLE 1

| Serial # | Condition | Voltage (V) | Current (mA) | Power (W) | Frequency (Hz) | Speed (rpm) | Effect relatively |
|---|---|---|---|---|---|---|---|
| 1 | Only one fan | 32.00 | 202.6 | 6.483 | 120 | 3600 | 68.6 |
| 1 | Reference Fan only | 17.60 | 537.3 | 9.456 | 120 | 3600 | 100 |

TABLE 1-continued

| Serial # | Condition | Voltage (V) | Current (mA) | Power (W) | Frequency (Hz) | Speed (rpm) | Effect relatively |
|---|---|---|---|---|---|---|---|
| 2 | Fan + house | 32.00 | 261.2 | 8.358 | 107 | 3210 | 68.3 |
| 2 | Reference 1 Fan + House | 17.60 | 629.2 | 11.074 | 104 | 3120 | |
| 2 | Reference 2 Fan + House | 18.60 | 658.2 | 12.242 | 107 | 3210 | 100 |
| 3 | Fan + House | 33.00 | 327.0 | 10.79 | 116 | 3480 | 63.8 |
| 3 | Reference | 22.00 | 769.0 | 16.92 | 116 | 3480 | 100 |
| 4 | Fan + House | 36.00 | 349.0 | 12.56 | 122 | 3660 | 62.3 |
| 4 | Reference Fan + House | 24.00 | 840.0 | 20.16 | 122 | 3660 | 100 |

The table shows that the workload was reached, according to the invention with an added effect of 68.6% of the effect added with the reference test (the conventional control circuitry).

In series 2 the fan housing was put on and conditions were otherwise unchanged. That is the electrical power incurred remained unchanged. Operated with the presented invention, the speed dropped from 3600 to 3210. Operated with the conventional control system (Ref 1) the speed decreased to 3120 rpm That is, the torque (per added effect) was greater using the invention's control system than with conventional management. Subsequently, the voltage of the power source was increased (Ref 2) the speed again corresponded to the speed using the invention's control, and added electrical effects were again compared. Power consumption using the invention was 68.3% of the power used by the conventional system.

In series 3 the voltage was again increased for using the invention for measuring and for measuring against the reference control until both achieved a motor speed of 3400. Power consumption when using the invention was now down to 63.8% of the power required by the reference.

In series 4, again the voltage was increased, this time to a constant speed of 3660 and the same comparison was made. This time the effect difference was marginally even greater, as control using the invention required only 62.3% of the power required by the conventional control.

The measurements above show that presented invention makes it possible to save more than 30% of supplied electrical energy for a given amount of work compared with conventional systems.

The invention is not limited to any given relative savings, but to the exploitation of the general principle shown here, as the savings can vary from application to application, and in some cases may be substantially less than what is shown here.

The invention claimed is:

1. A method for controlling an inductive load to reduce energy consumption by the inductive load, the method comprising:
    carrying out a first phase of operation, which comprises providing a primary electrical circuit having, in series, a DC power source, an inductive load, and a DC capacitor, and driving the inductive load by the DC power source, and charging the DC capacitor;
    carrying out a second phase of operation, which comprises providing a secondary electrical circuit that is partly concurrent with the primary electrical circuit, and driving the inductive load by discharging the DC capacitor while the DC source is temporarily disconnected and not part of the secondary circuit; and repeating the first phase of operation and the second phase of operation a desired number of times;

wherein the inductive load is selected from the group consisting of motors, transformers, and equipment for lighting and heating.

2. The method in accordance with claim 1, wherein the primary electrical circuit comprises a first electrical switch that is closed in the first phase of operation, and the secondary electrical circuit comprises a second electrical switch which is open in the first phase of operation, and wherein the opening of the first electrical switch and the closing of the second electrical switch changes a flow path from the primary electrical circuit to the secondary electrical circuit.

3. The method in accordance with claim 1, wherein a one-to-one relationship exists between charging/discharging of the DC capacitor and the first and second phases of operation.

4. A control circuit for reducing energy consumption by an inductive load, the control circuit comprising:
   a primary electrical circuit,
   a secondary electrical circuit that is partially concurrent with the primary electrical circuit,
   wherein the primary electrical circuit is in series and includes a DC power source, an inductive load, and a DC capacitor, wherein the secondary electrical circuit includes the inductive load and the DC capacitor,
   two electrical switches arranged so that a current in a first operational phase is driven through the primary electrical circuit by voltage supplied by the DC power source, and current in a second operational phase is driven through the secondary electrical circuit by the voltage supplied by the DC capacitor, and
   wherein the inductive load is selected from the group consisting of motors, transformers, and equipment for lighting and heating.

5. A method for controlling an inductive load to reduce energy consumption by the inductive load, the method comprising:
   carrying out a first phase of operation, which comprises providing a primary electrical circuit having, in series, a DC power source, an inductive load, and a DC capacitor, and driving the inductive load by the DC power source, and charging the DC capacitor;
   carrying out a second phase of operation, which comprises providing a secondary electrical circuit that is partly concurrent with the primary electrical circuit, and driving the inductive load by discharging the DC capacitor while the DC source is temporarily disconnected and not part of the secondary circuit, wherein the current in the secondary circuit flows in a direction that is opposite the direction of the current in the primary circuit; and
   repeating the first phase of operation and the second phase of operation a desired number of times.

6. The method of claim 5, wherein the inductive load is selected from the group consisting of motors, transformers, and equipment for lighting and heating.

* * * * *